United States Patent Office 3,505,318
Patented Apr. 7, 1970

3,505,318
PROCESS FOR THE PRODUCTION OF
BENZOTRIAZOLE DERIVATIVES
Carl-Wolfgang Schellhammer, Opladen, and Wolf-Dieter Wirth, Cologne-Stammheim, Germany, assignors to Farbenfabriken Bayer Aktiengesellschaft, Leverkusen, Germany, a corporation of Germany
No Drawing. Filed Mar. 29, 1968, Ser. No. 717,397
Claims priority, application Germany, Apr. 1, 1967,
F 51,999
Int. Cl. C07d *57/02, 55/04;* C09b *23/14*
U.S. Cl. 260—240               2 Claims

ABSTRACT OF THE DISCLOSURE

Process for the production of novel benzotriazole derivatives, characterized in that a benzotriazole-(2)-acetic acid of the general formula

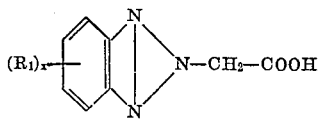

in which $x$ stands for 1, 2 or 3, and $R_1$ means hydrogen, alkyl, alkoxy, acetylamino, dialkylamino, whereby the alkyl groups, together with the nitrogen atom, may be components of a heterocyclic ring which may also contain as further hetero atom oxygen, sulphur or nitrogen, halogen, CN, COOH, $SO_3H$ or $SO_2$-alkyl, is reacted with at least the stoichiometrically required amount of an optionally substituted benzaldehyde of the formula

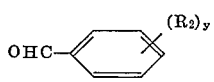

in which $y$ stands for 1, 2, or 3, and $R_2$ may be identical with or different from $R_1$, and where one of the radicals $R_1$ may also denote an aldehyde group,
in the presence of piperidine, within a temperature range of about 120 to about 200° C., and the water formed in the reaction is continuously removed if desired.

The invention further comprises the novel benzotriazole derivatives formed by the noted process and having the general formula

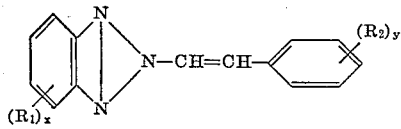

in which $x$ and $y$ stand for 1, 2, or 3, and wherein $R_1$ has the same meaning as that above, $R_2$ may be identical with or different from $R_1$ and may also denote, if $y$ is equal to 1, the radical

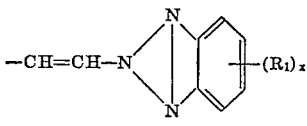

It has been found that novel benzotriazole derivatives are obtained when a benzotriazole-(2)-acetic acid of the general formula

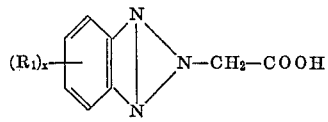

in which $x$ stands for 1, 2 or 3, and wherein $R_1$ denotes hydrogen, alkyl, alkoxy, $NO_2$, acetylamino, dialkylamino, whereby the alkyl groups, together with the nitrogen atom may also be components of a heterocyclic ring which may also contain as a further hetero atom oxygen, sulphur or nitrogen, halogen, CN, COOH, $SO_3H$ or —$SO_2$-alkyl,
are reacted with at least the stoichiometrically required amount of an optionally substituted benzaldehyde of the formula

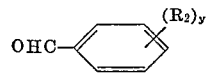

in which $y$ stands for 1, 2 or 3, and $R_2$ may be identical with or different from $R_1$, and wherein one of the radicals $R_1$ may also mean, in addition, an aldehyde group,
in the presence of piperidine, within a temperature range from about 120– about 200° C., continuously removing the water formed in the reaction, if desired.

The radicals $R_1$ or $R_2$ include, besides hydrogen, alkyl or alkoxy radicals and dialkylamino groups, preferably containing one to four carbon atoms in the alkyl radical; halogen atoms are preferably fluorine, chlorine and bromine; alkylsulphonyl groups generally contain up to four carbon atoms in the alkyl radical.

The process according to the invention may be illustrated by the example of the reaction of benzotriazole-(2)-acetic acid with benzaldehyde:

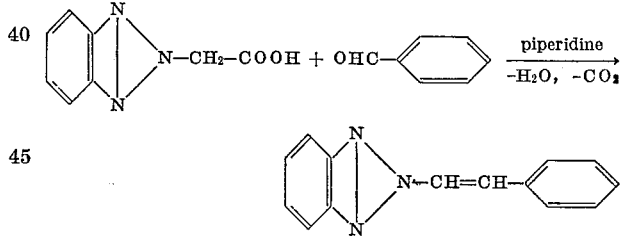

The starting compounds to be used for the process according to the invention are known or they can be obtained according to known processes. Examples of benzotriazole-(2)-acetic acid derivatives are the following:

4-nitro-benzotriazole-(2)-acetic acid
4-methyl-benzotriazole-(2)-acetic acid
4,7-dimethyl-benzotriazole-(2)-acetic acid
4,5,7-trimethyl-benzotriazole-(2)-acetic acid
4-methoxy-benzotriazole-(2)-acetic acid
5-methoxy-benzotriazole-(2)-acetic acid
5-acetylamino-benzotriazole-(2)-acetic acid
4,7-dichloro-benzotriazole-(2)-acetic acid
5-bromo-benzotriazole-(2)-acetic acid
5-methylsulphonyl-benzotriazole-(2)-acetic acid
5-cyano-benzotriazole-(2)-acetic acid
benzotriazole-(2)-acetic acid-5-suphonic acid The benzaldehydes which are used and may be substituted are known from the literature.

The process is carried out within a temperature range of about 120– about 200° C., preferably at 140–180° C. The piperidine required for the reaction can be used in catalytic amounts as well as in molar amounts, referred to the carboxylic acid used.

The process can be carried out in the absence as well as in the presence of organic diluents boiling above about 120° C. By way of example, there may be mentioned as diluents 1,2-dichlorobenzene or 1,2,4-trichlorobenzene. In general, it is expedient to continuously remove during the reaction the water liberated in the course of the reaction.

Working up of the reaction mixtures to isolate the benzotriazole derivatives is carried out in known manner.

The novel 2-styryl-benzotriazoles obtainable according to the process according to the invention are valuable intermediates for the production of dyestuffs. Some of these compounds have a blue fluorescence.

EXAMPLE 1

17.7 g. benzotriazole-(2)-acetic acid, 11 g. benzaldehyde and 5 cc. piperidine are heated to 160–170° C., while stirring. The water formed in the reaction is distilled off. After one hour, the contents of the flask are poured on to ice-water, the mixture is rendered acid to Congo red with concentrated hydrochloric acid and the precipitated material is filtered off. There is obtained 2-styryl-benzotriazole in the form of pale yellowish-greenish crystals which melt at 80–82° C. after redissolution from N,N-dimethyl-formamide/water.

Solutions of the compound in N,N-dimethyl formamide or ethyl acetate exhibit in daylight an intense, violet-blue fluorescence.

The following compounds are obtained in an analogous manner:

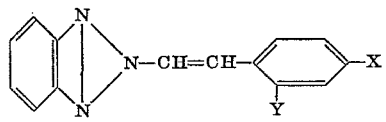

| X | Y | Colour of crystals | M.P. ° C. | Fluorescence |
|---|---|---|---|---|
| CH₃ | H | Yellow | 120–125 | Blue. |
| OCH₃ | H | do | 116–120 | Blue-green. |
| NO₂ | H | Brown-red | 260–265 |  |
| NH—CO—CH₃ | H | Yellow | 215–217 | Blue. |
| H | SO₃Na | Colourless | >360 | Do. |
| SO₂—CH₃ | H | Pale yellow | 226 | Blue-violet. |
| CN | H | do | 214–215 | Do. |
| 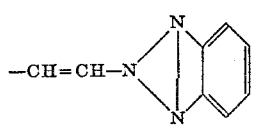 | H | do | 354–356 | Blue. |

EXAMPLE 2

19 g. 5-methyl-benzotriazole-(2)-acetic acid, 16.5 g. 4-acetylamino-benzaldehyde and 7 cc. piperidine are heated at 170–180° C. for 45 minutes. In the course of the reaction, the water formed is distilled off. The reaction mixture is poured on to ice-water, the separated material is filtered off with suction and redissolved from a small amount of alcohol. There is obtained 2-p-acetyl-amino-styryl-5-methyl-benzotriazole of M.P. 228°–231° C. in the form of pale yellow crystals.

When dissolved in ethyl acetate or N,N'-dimethyl formamide, the compound has an intense blue fluorescence in daylight. The 5-methyl-benzotriazole-(2)-acetic acid was obtained as follows: 167 g. 5-methyl-benzotriazole, 158 g. sodium carbonate, 2 litres water and 132 g. chloroacetic acid are heated for 5 hours under reflux and while stirring. After cooling, the reaction mixture is rendered acid to Congo and the separated reaction product is filtered off with suction. The crude, moist material is dissolved hot in a mixture of 1220 cc. concentrated hydrochloric acid and 775 cc. water, and the solution is slowly cooled. There separate 38 g. 5-methyl-benzotriazole-(2)-acetic acid of M.P. 192–193° C.

EXAMPLE 3

300 g. 5-nitro-benzotriazole-(2)-acetic acid, 145 g. benzaldehyde and 110 g. piperidine are heated at 160° C., while stirring, and the water formed in the reaction is distilled off. The melt is poured into 3 litres methanol. After cooling, the separated yellow crystals are filtered off with suction and redissolved from glycol-monomethyl ether acetate. 5-nitro-2-styryl-benzotriazole of M.P. 168° C. is obtained.

In an analogous manner there are obtained:

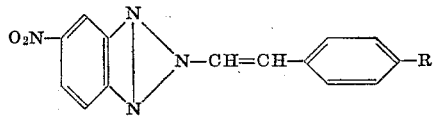

| R | Colour of crystals | M.P., ° C. |
|---|---|---|
| —CH₃ | Yellow | 263 |
| —OCH₃ | do | 247–248 |
| —N(CH₃)(CH₃) | Red | 170–176 |
| —Cl | Yellow | 209 |

The 5-nitro-benzotriazole-(2)-acetic acid was obtained as follows: 551 g. 5-nitro-benzotriazole, 410 g. chloroacetic acid sodium salt, 5 litres water and 138 g. sodium hydroxide are heated at boiling temperature for 16 hours, while stirring. The reaction mixture is then rendered acid to Congo, the separated material is filtered off with suction and redissolved from 20% hydrochloric acid. There is obtained 5-nitro-benzotriazole-(2)-acetic acid in the form of small pale yellow crystals which melt at 208–211° C.

EXAMPLE 4

687 g. 5-nitro-benzotriazole-(2)-acetic acid, 318 g. benzaldehyde and 75 cc. piperidine are heated under reflux, while stirring, in 2 litres o-dichlorobenzene. The water formed in the reaction is distilled off together with some o-dichlorobenzene. When water no longer distills over, this being the case after about 5 hours, the reaction mixture is cooled and the separated yellow crystals are filtered off with suction. Two thirds of the 1,2-dichlorobenzene are distilled off from the mother liquor, and the crystals precipitated from the distillation residue are also filtered off with suction. There are thus obtained 235 g. 5-nitro-2-styryl-benzotriazole which melts at 168–171° C. after redissolution from glycolmonomethyl ether acetate.

We claim:
1. Process for the production of novel benzotriazole derivatives, characterized in that a benzotriazole-(2)-acetic acid of the general formula

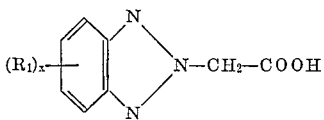

in which $x$ stands for 1, 2 or 3, and $R_1$ means hydrogen, lower alkyl, lower alkoxy, acetylamino, di-lower-alkyl-amino, halogen, CN, COOH, $SO_3H$, or $-SO_2$-lower alkyl is reacted with at least the stoichiometrically required amount of an optionally substituted benzaldehyde of the formula

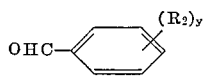

in which $y$ stands for 1, 2 or 3, and $R_2$ may be identical with or different from $R_1$, and where one of the radicals $R_1$ may also denote an aldehyde group in the presence of piperidine, within a temperature range of about 120 to about 200° C., and the water formed in the reaction is continuously removed if desired.

2. A benzotriazole compound of the formula

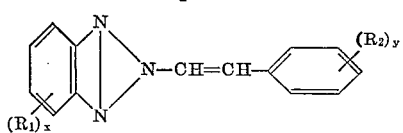

in which $x$ and $y$ stand for 1, 2 or 3, and wherein $R_1$ is selected from the group consisting of hydrogen, lower alkyl, lower alkoxy, acetylamino, di-lower-alkylamino, halogen, CN, COOH, $SO_3H$, and $-SO_2$-lower alkyl, and wherein $R_2$ may be identical with or different from $R_1$, and may also denote, if $y$ is equal to 1, the radical

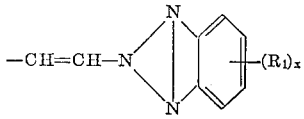

References Cited

UNITED STATES PATENTS 2,784,184  3/1957  Zweidler et al. _____ 260—240
3,101,333  8/1963  Adams et al. _____ 260—240

FOREIGN PATENTS 874,456  5/1942  France.

OTHER REFERENCES

Beilsteins Handbuch der Organischen Chemie, 4th ed., vol. 26, page 10 (system No. 3803), Erstes Erganzungswerk, Berlin, Germany (1938).

Chemical Abstracts II, vol. 56, cols. 8214 to 8216 (1962) (abstract of German Patent 1,105,713).

Chemical Abstracts, vol. 58, cols. 3077 to 3078 (1963) (abstracts of Benes on col. 3077 and of Zhadanov et al. on col. 3078).

JOHN D. RANDOLPH, Primary Examiner

U.S. Cl. X.R.

260—240.9, 308; 252—301.2